US006622584B2

(12) United States Patent
Stäehle

(10) Patent No.: US 6,622,584 B2
(45) Date of Patent: Sep. 23, 2003

(54) ACTUATOR FOR OPERATING THE FOOT PEDALS OF A MOTOR VEHICLE

(76) Inventor: Kurt Stäehle, Liebenseller Strasse 16, D-73242 Neuhausen-Steinegg (DE)

( * ) Notice: Subject to any disclaimer, the term of this patent is extended or adjusted under 35 U.S.C. 154(b) by 0 days.

(21) Appl. No.: 09/985,220

(22) Filed: Nov. 2, 2001

(65) Prior Publication Data

US 2002/0053497 A1 May 9, 2002

(30) Foreign Application Priority Data

Nov. 3, 2000 (DE) .......................................... 100 54 569

(51) Int. Cl.[7] ................................................ G05G 9/00
(52) U.S. Cl. ........................................... 74/478; 74/512
(58) Field of Search ........................... 74/560, 512, 54, 74/53, 478; 192/84.6, 83; 73/117

(56) References Cited

U.S. PATENT DOCUMENTS

| | | | | | |
|---|---|---|---|---|---|
| 3,157,063 | A | * | 11/1964 | Mussell | 74/512 |
| 4,255,984 | A | * | 3/1981 | Abels et al. | 73/117 |
| 4,742,720 | A | * | 5/1988 | Storck | 73/117 |
| 4,870,871 | A | * | 10/1989 | Ivan | 74/512 |
| 5,092,749 | A | * | 3/1992 | Meijer | 74/53 |
| 5,172,589 | A | * | 12/1992 | Witt | 73/117 |
| 5,172,606 | A | * | 12/1992 | Dzioba et al. | 74/512 |
| 5,896,781 | A | * | 4/1999 | Muller | 74/512 |
| 6,155,385 | A | * | 12/2000 | Basnett | 74/512 |
| 6,357,232 | B1 | * | 3/2002 | Strashny | 74/512 |
| 6,374,695 | B1 | * | 4/2002 | Johansson et al. | 74/512 |
| 6,443,028 | B1 | * | 9/2002 | Brock | 74/512 |

FOREIGN PATENT DOCUMENTS

| | | |
|---|---|---|
| DE | 3303588 | 8/1983 |
| EP | 0236518 | 9/1987 |

OTHER PUBLICATIONS

Brock et al., Adjustable Pedal Apparatus, Nov. 15, 2001, US 2001/0039849 A1.*
Zhang et al., Control System for Adjustable Pedal Assembly, Jun. 27, 2002, US 2002/0078786 A1.*

* cited by examiner

*Primary Examiner*—Richard M. Lorence
*Assistant Examiner*—Eric M. Williams
(74) *Attorney, Agent, or Firm*—Browdy and Neimark, P.L.L.C.

(57) ABSTRACT

An actuator for operating the foot pedals of a motor vehicle with the aid of a servomotor. The actuator has two actuating arms which can be alternatingly actuated by selecting the direction of rotation of the servomotor. First and second coupling elements in the form of, respectively, an eccentric device and a pin projecting radially away from the motor shaft are provided to produce this alternating action on either actuating arm. It is thus possible to selectively actuate either the brake pedal or the gas pedal, for example, of a motor vehicle with a mutual device which makes only minimal demands on space and is cost-effective.

22 Claims, 16 Drawing Sheets

ACTUATOR FOR OPERATING THE FOOT PEDALS OF A MOTOR VEHICLE

BACKGROUND OF THE INVENTION

The present invention relates to an actuator for operating the foot pedals of a motor vehicle with the aid of a servomotor.

In the course of functional and fatigue testing of a motor vehicle, it is customary to have appropriate robots perform the pedal and steering wheel movements, so that movement sequences of these devices are generated which correspond to a large extent to the actual sequences of the operation of the motor vehicle. As a rule, such devices consist of frames with arms that are hinged to each other in a lever-like manner and create these typical movements, and of actuating elements, which act on the respective operating elements, for example the gas pedal, and create the desired movement sequences.

Devices for operating at least one foot pedal, either the gas pedal or the brake pedal, are known from DE 39 40 588 A1 or EP 0 235 333 B1, which describe the arrangement of a drive robot on the driver's seat. Hydraulically or pneumatically operating actuating elements are provided for operating the pedals, which require solid anchoring and support.

Only limited space is available in the lower area of the motor vehicle for the drive and actuating devices for performing the automatic operation of the gas pedal, the brake pedal and the clutch pedal, so that it is necessary to make optimal use of the available space.

SUMMARY OF THE INVENTION

The present invention provides an actuator that can selectively operate either the brake pedal, the clutch pedal, or the accelerator, or gas, pedal of a motor vehicle, has minimum space requirements and is cost-effective.

For this purpose, the invention provides an actuator for operating foot pedals of a motor vehicle, the actuator comprising: a servomotor having a motor shaft that is selectively rotatable in either one of two senses; and two actuating arms coupled to the servomotor, each actuating arm being adapted to operate a first one of the vehicle foot pedals in response to rotation of the motor shaft in a first one of the two senses and to operate a second one of the vehicle foot pedals in response to rotation of the motor shaft in a second one of the two senses.

The idea on which the invention is based resides in that either an actuating arm for one pedal or an actuating arm for another pedal is actuated, depending on the selection of the direction of rotation of the servomotor, so that a single common servomotor suffices for actuating two pedals.

In accordance with advantageous embodiments of the invention, first and second coupling elements, each in the form of an eccentric device and of a pin radially projecting away from the motor shaft, are provided, which cause this alternating action on respectively one actuating arm or the other.

A preferred exemplary embodiment of the invention will now be described in greater detail, making reference to the drawings.

DETAILED DESCRIPTION OF THE INVENTION

Figure 1:
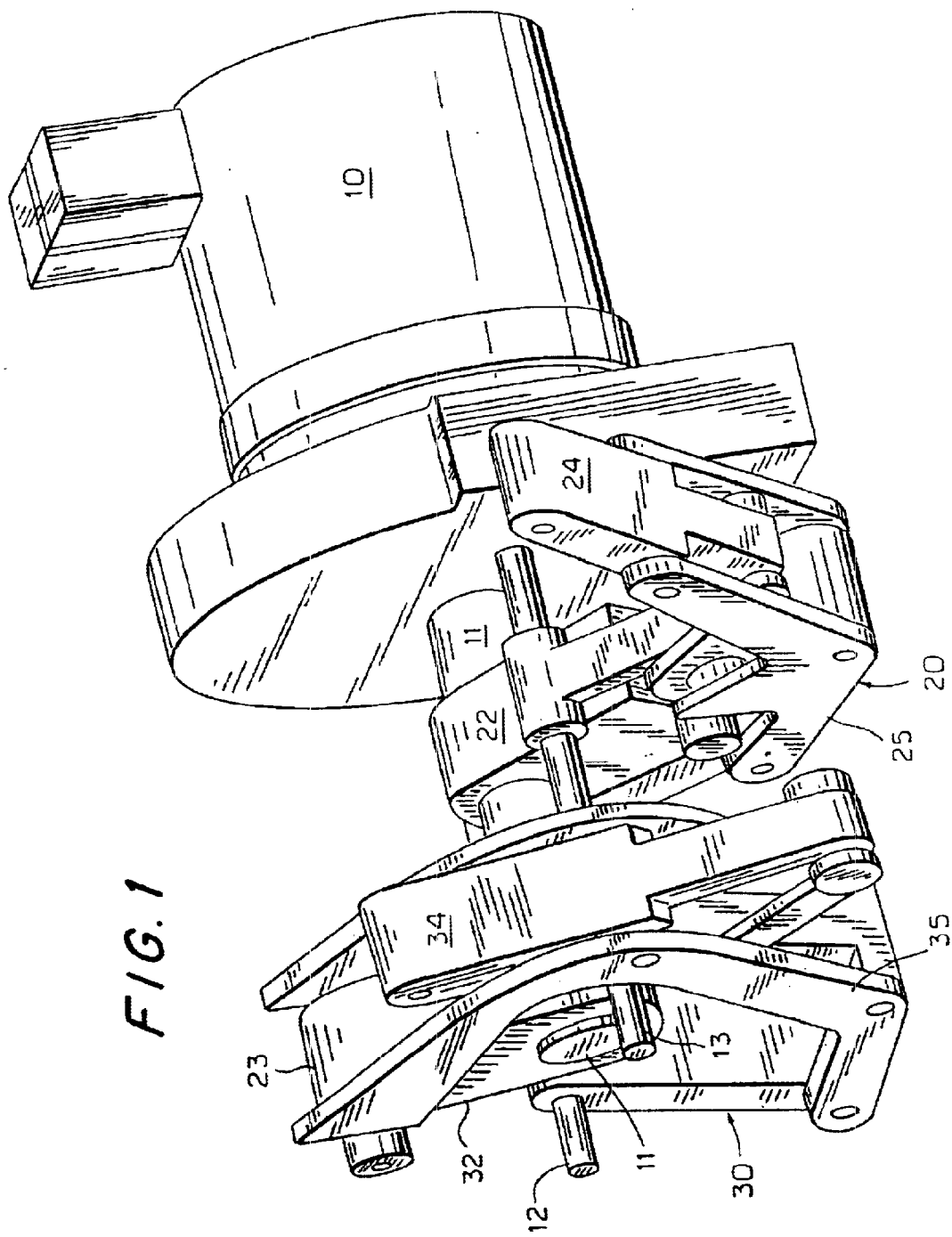
FIGS. 1 to 3 are perspective basic representations of an actuator according to the invention, in the full braking position, viewed from three different directions.
Figure 2:
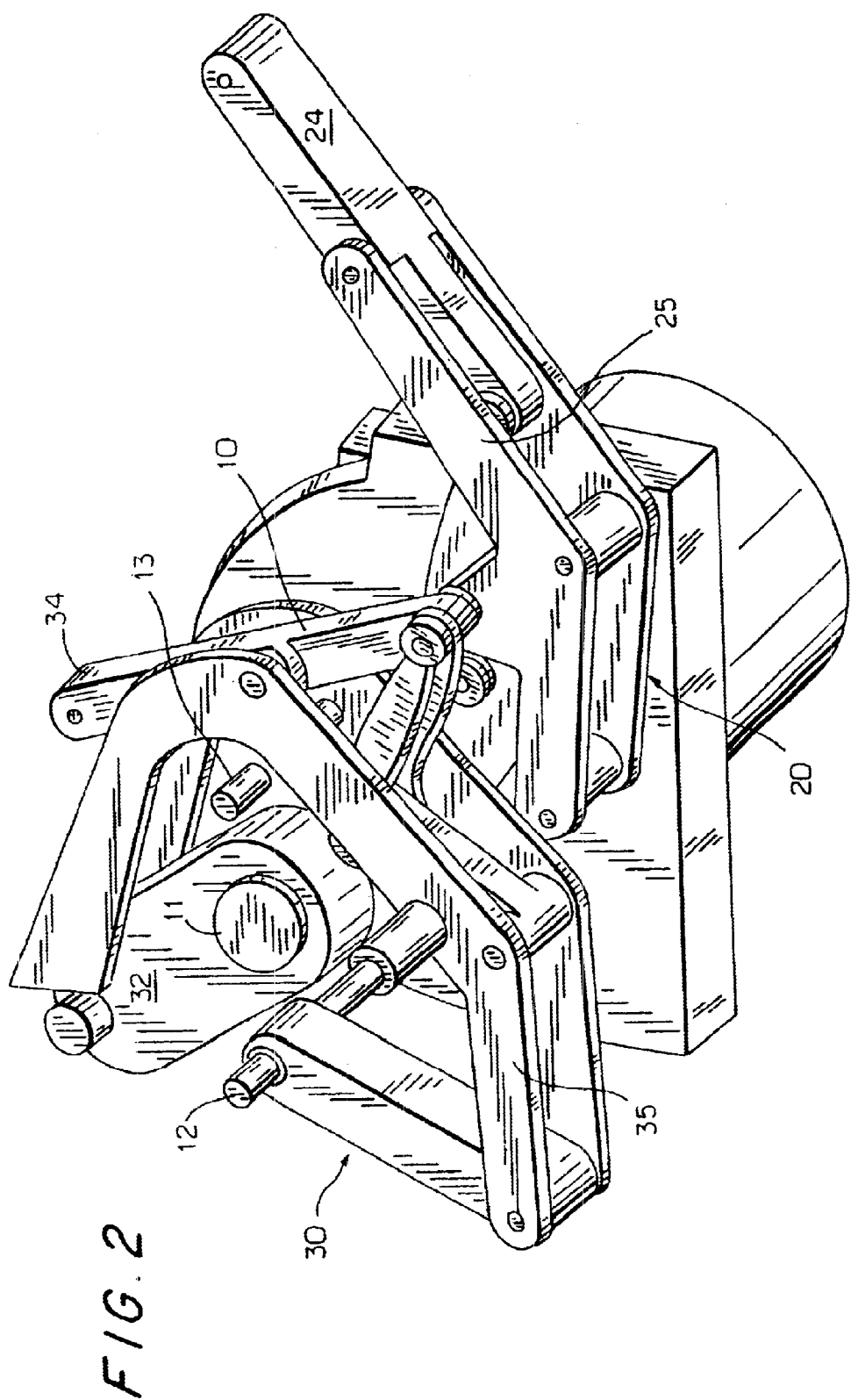
Figure 3:
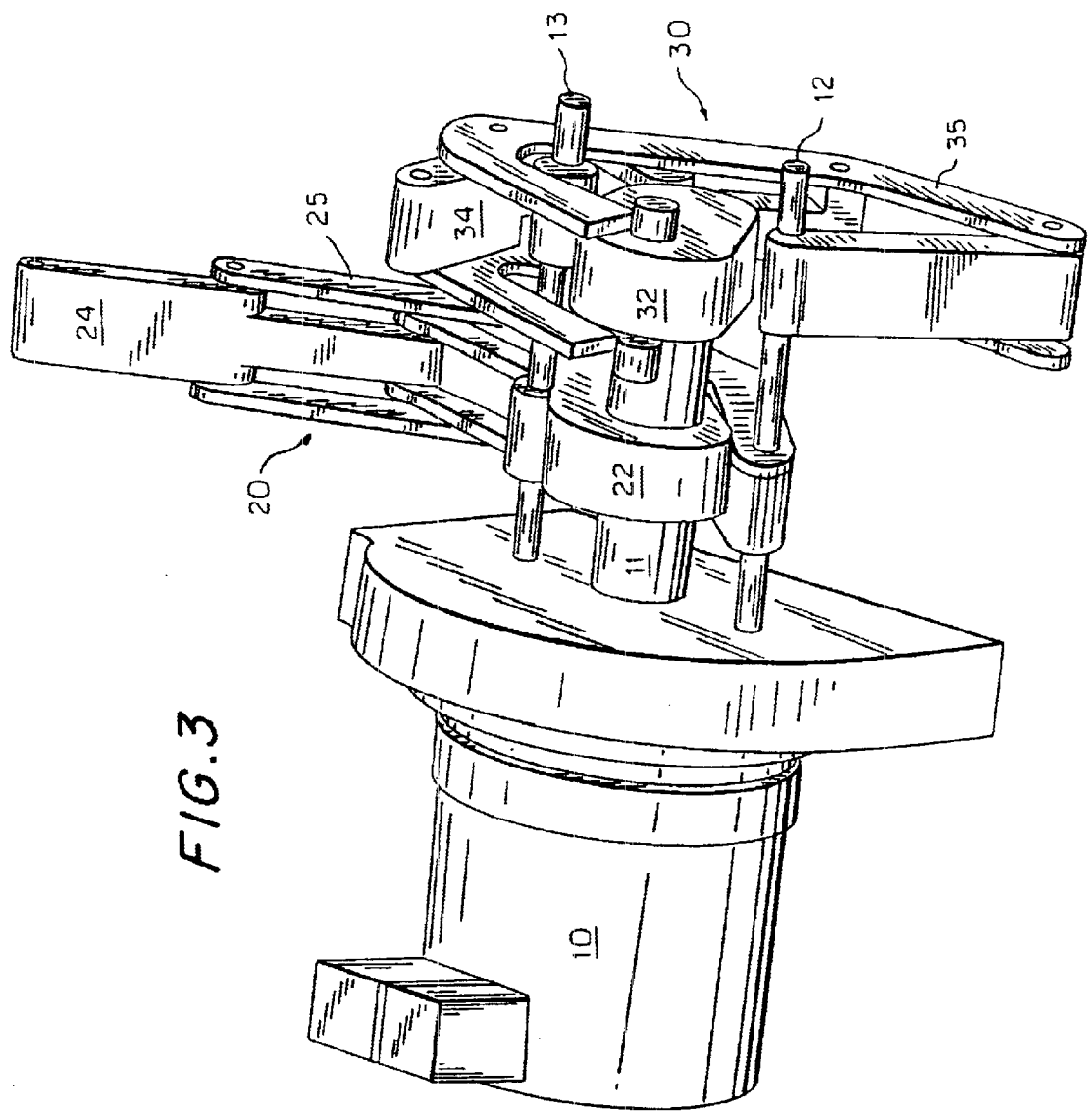
Figure 4:
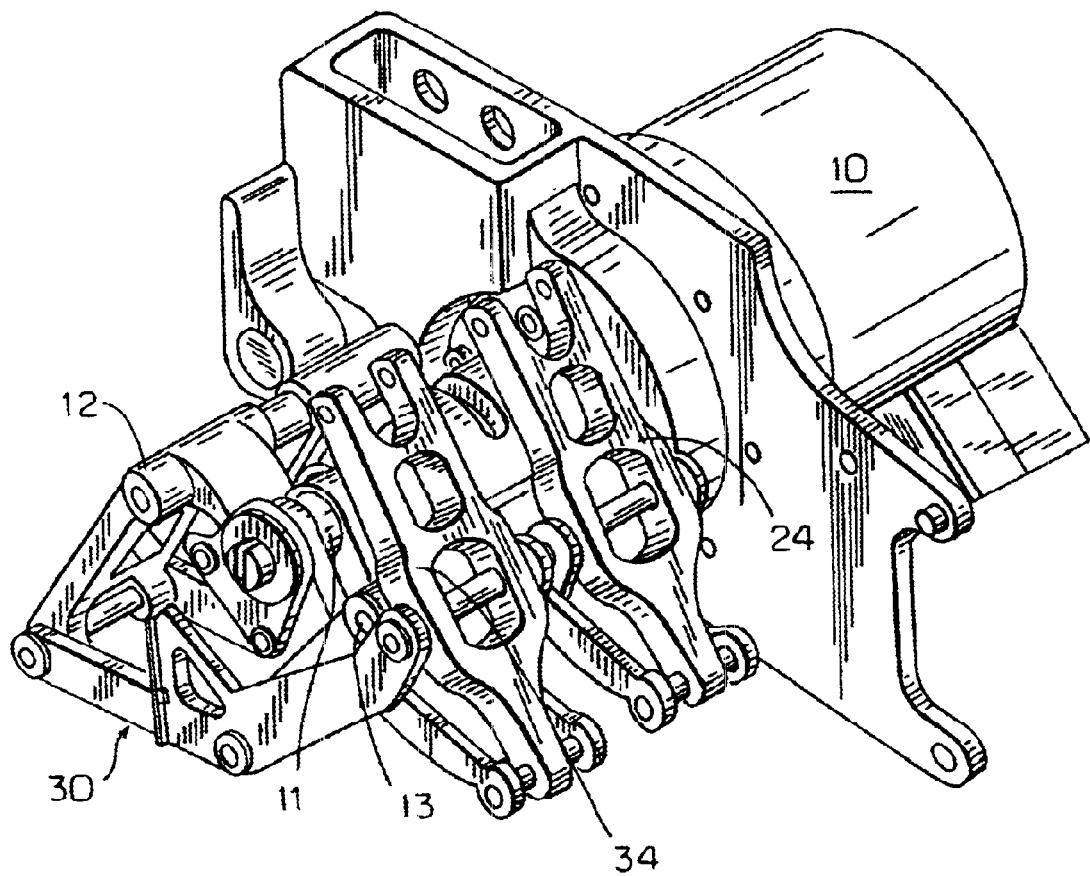
FIG. 4 is a perspective view of an actuator according to the invention in the basic position.
Figure 5:
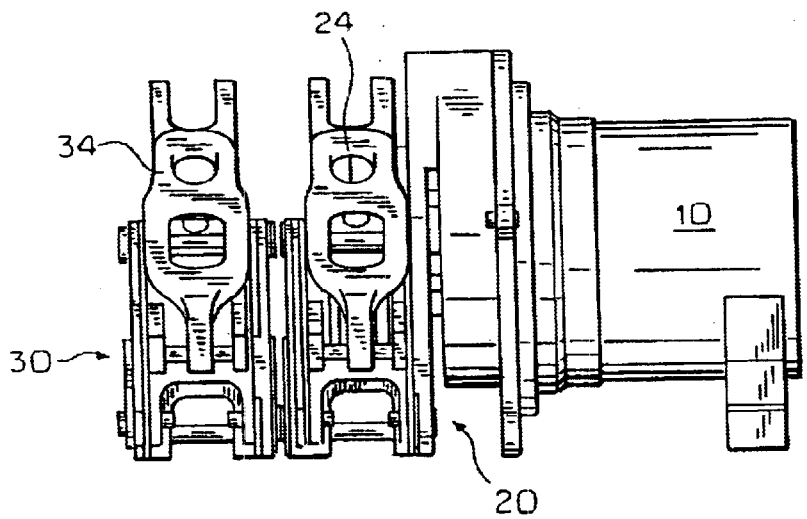
FIG. 5 is a top view of the actuator of FIG. 4.

The basic structure of an actuator according to the invention is shown in FIGS. 1, 2 and 3, which illustrate the actuator, in perspective views from three different directions, in the full braking position. A first actuating arm 20 with an actuating element 24 for a first foot pedal is in an operating, or active, position, while a second actuating arm 30 with an actuating element 34 rests in an inactive position. The actuating arms 20 and 30 are respectively hinged on a first pivot shaft 12 and on a second pivot shaft 13, which are mounted in parallel with a motor shaft 11 in a support plate of a housing of a servomotor 10. Only the structurally important elements are represented in FIGS. 1–3, i.e. those elements required for performing the actuating movements, but not those elements which are required for structural purposes for the mechanical reinforcement or optimization of the mechanical structure. Such elements can vary, depending on the layout of the actuator and are not the subject of the invention.

Two eccentric devices or eccentric cams 22 and 32 are seated on the motor shaft 11 and constitute first coupling elements. During rotation of the motor shaft 11 by the servomotor 10, one or the other of devices 22, 32 is acted upon in such a way as to produce a force coupling with the associated actuating arm 20 or 30 in the sense that pivoting of the associated eccentric device 22, 32 results in pivoting out of the associated actuating arm 20, 30. Here, their shape and their hinged attachment to the first and second pivot shafts 12 and 13 is defined in such a way that the pivot movement of the actuating element 24 or 34, required for the actuation of the respectively associated foot pedal, is performed by means of the rotary movement of the respective eccentric device 22, 32.

Here, the basic idea lies in that the coupling of the eccentric devices 22, 32 to the motor shaft 11 depends on the direction of rotation of the servomotor 10. In this case, starting from a neutral position, motor shaft 11 is rotated either toward the right (clockwise) or to the left (counterclockwise), as viewed from the left-hand end in FIG. 1, depending on which of the actuating elements 24 or 34 is intended to perform an actuating movement for operating the foot pedal associated with it.

Figure 7:
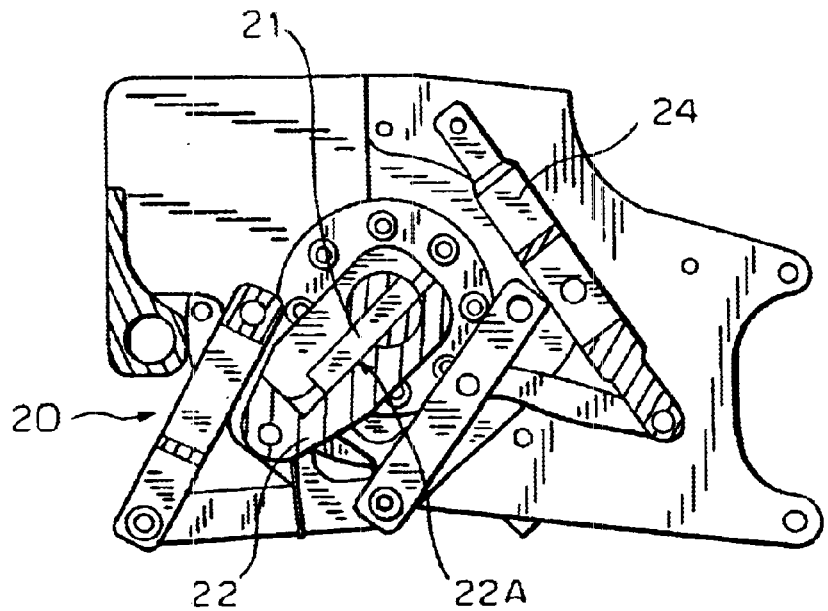
FIGS. 7 and 8 are cross-sectional views taken along lines 7—7 and 8—8, respectively, of FIG. 6.
Figure 8:
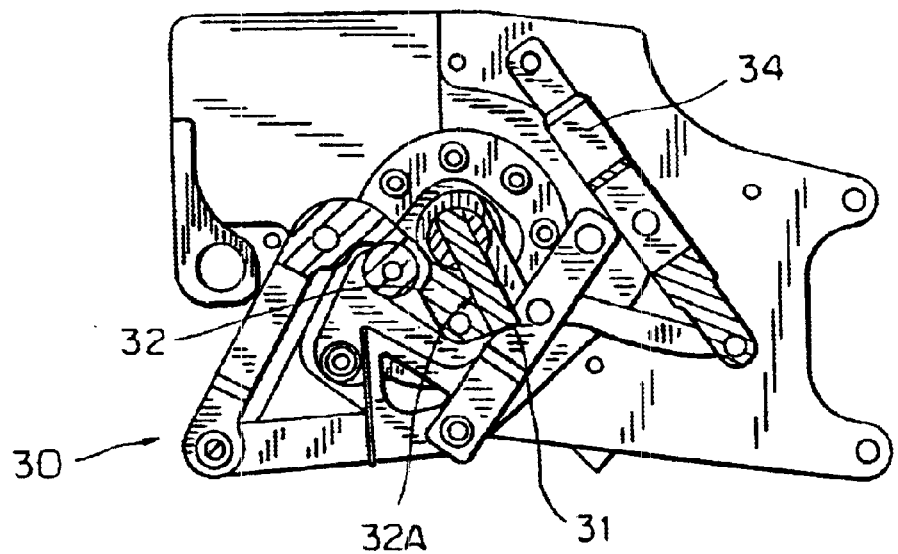
Figure 9:
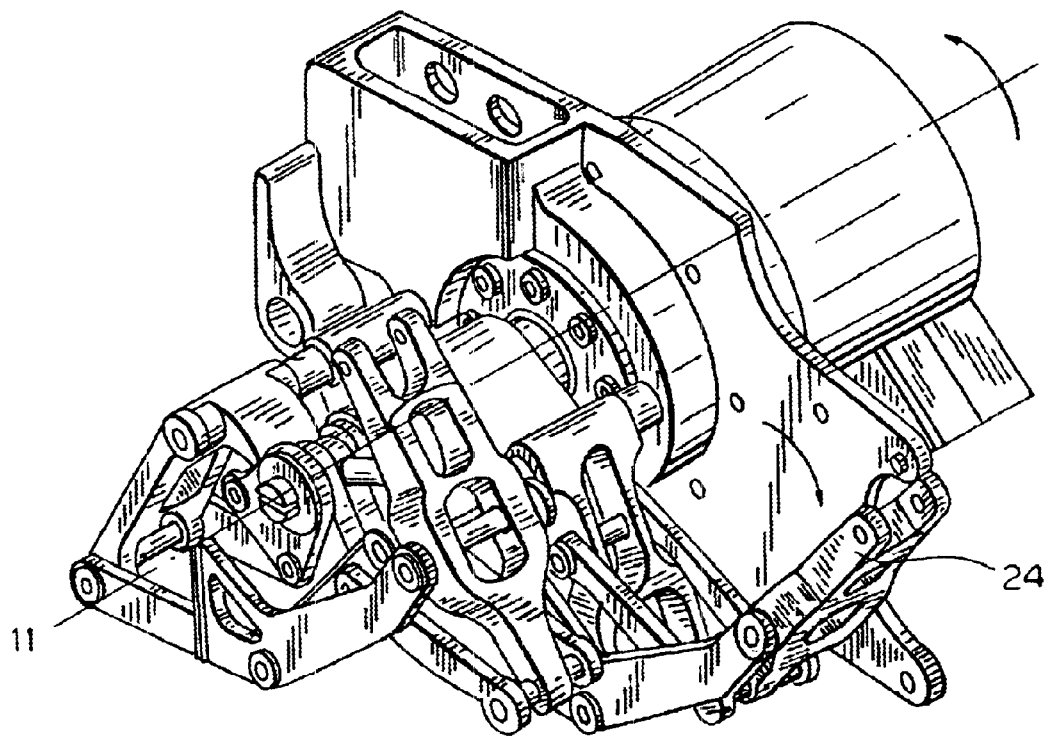
FIGS. 9 to 13 are views corresponding to those of FIGS. 4–8, respectively, showing the actuator in the full braking position.
Figure 10:
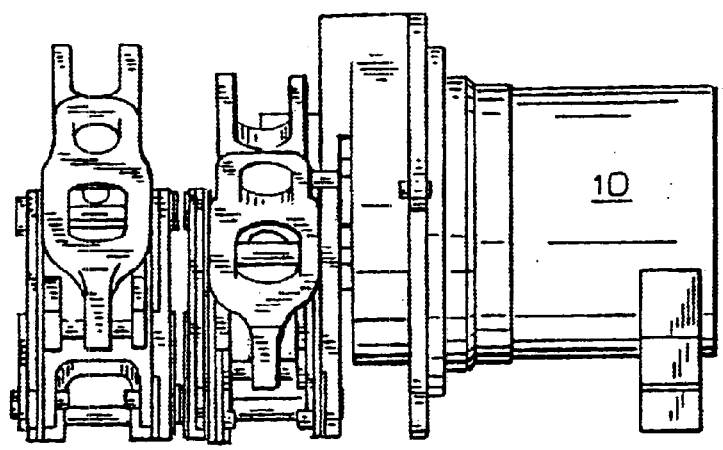

To achieve this, second coupling elements, here constituted by pins 21, 31 (see FIGS. 7 and 8) radially projecting away from the motor shaft 11, are provided. Each of pins 21, 31 acts together with a respective stop 22A, 32A, respectively, attached to an associated eccentric device 22 or 32, depending on the direction, or sense, of rotation of shaft 11, in such a way that during rotation in a first, clockwise, direction of rotation the first pin 21 acts on the stop 22A in the eccentric device 22, but the second pin 31 in the eccentric device 32 is moved away from its associated stop 32A into a space in which the rotation of the second pin 31 can take place without acting on its associated eccentric device 32 as the associated second coupling element.

A rotation of the motor shaft 11 out of the neutral position in a counterclockwise direction correspondingly leads to the second pin 31 now acting on its associated stop 32A in the eccentric device 32 as the second coupling element and therefore results in the extension of the second actuating arm 30 and of the associated actuating element 34 for the actuating movement on the second foot pedal.

Figure 6:
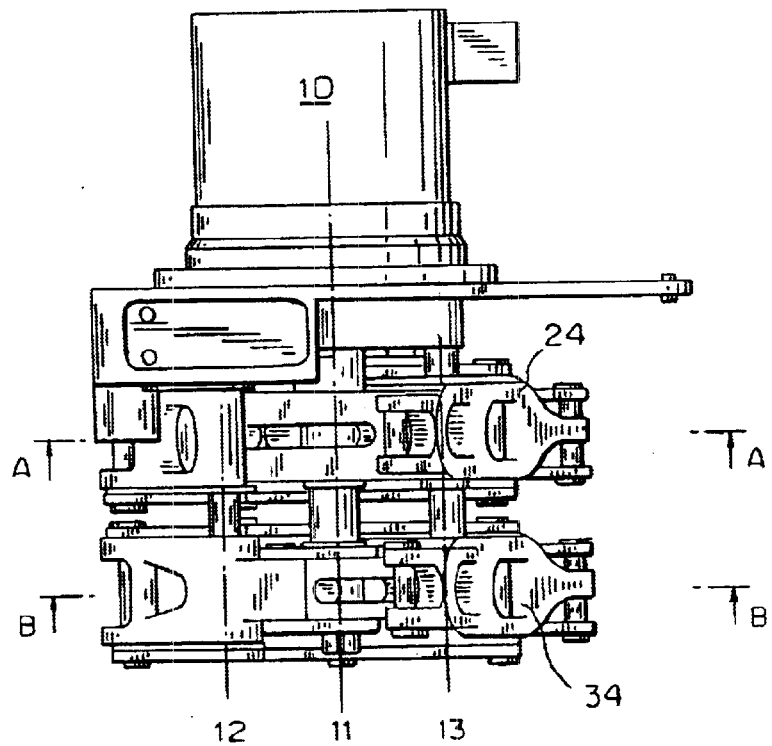
FIG. 6 is a bottom view of the actuator of FIG. 4.
Figure 11:
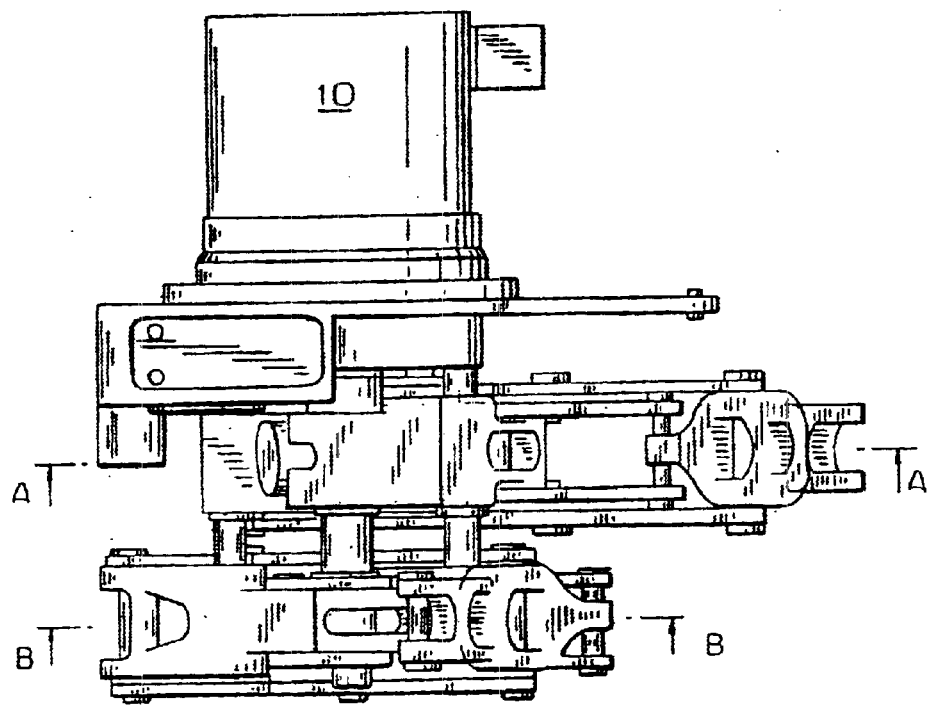
Figure 12:
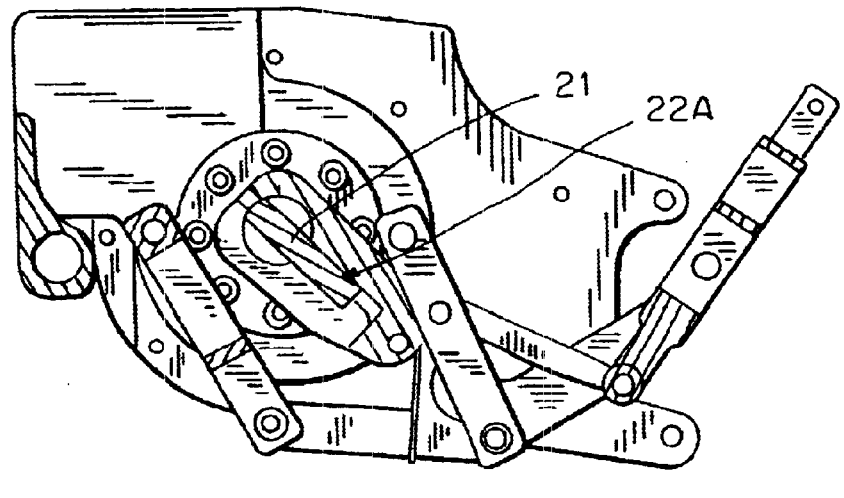
Figure 13:
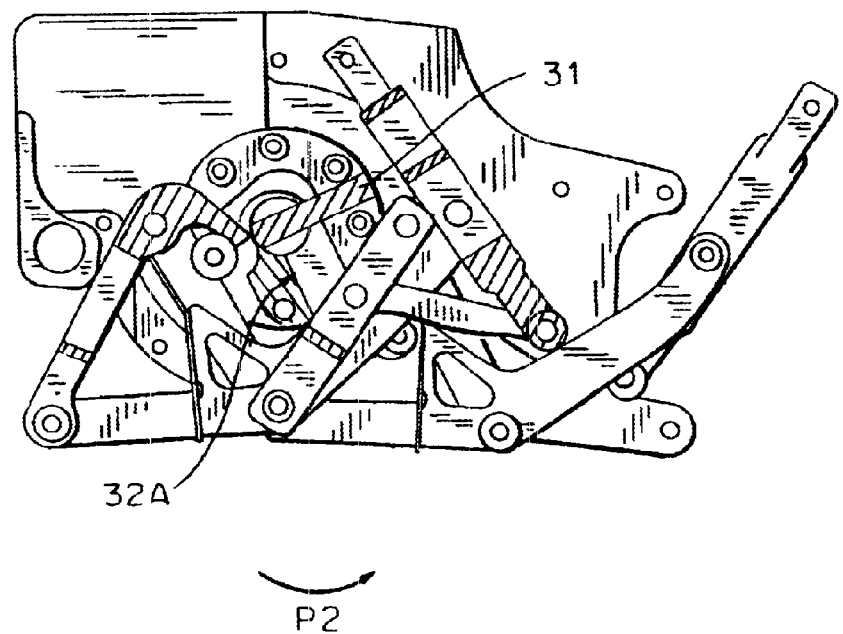
Figure 14:
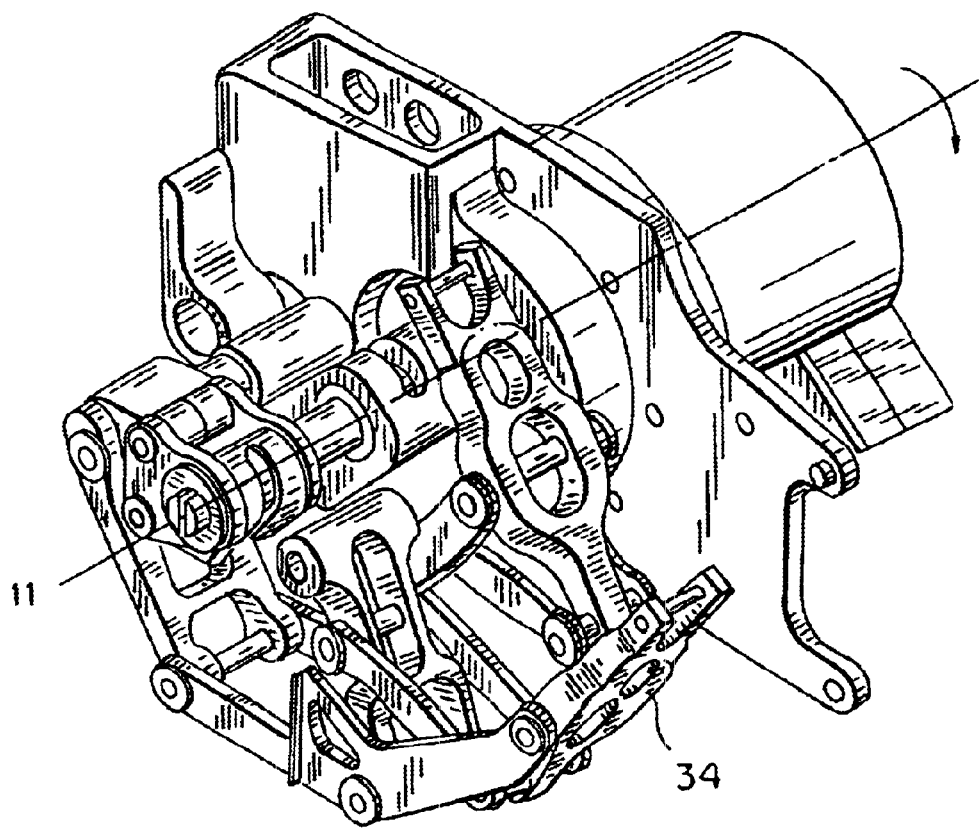
FIGS. 14 to 18 are views corresponding to those of FIGS. 4–8, respectively, showing the actuator in the full throttle position.
Figure 15:
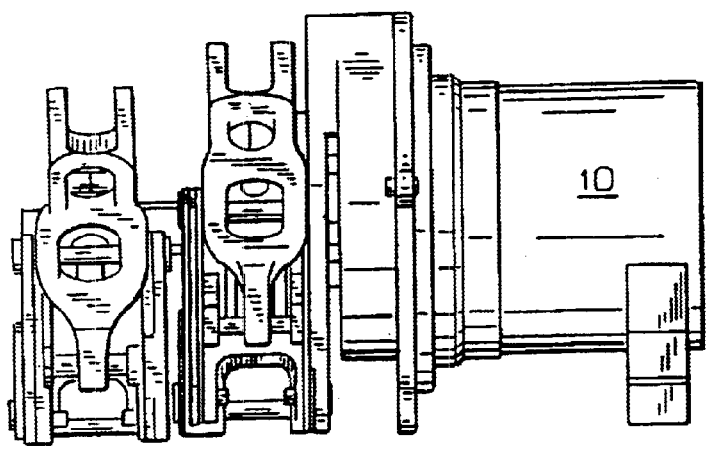
Figure 16:
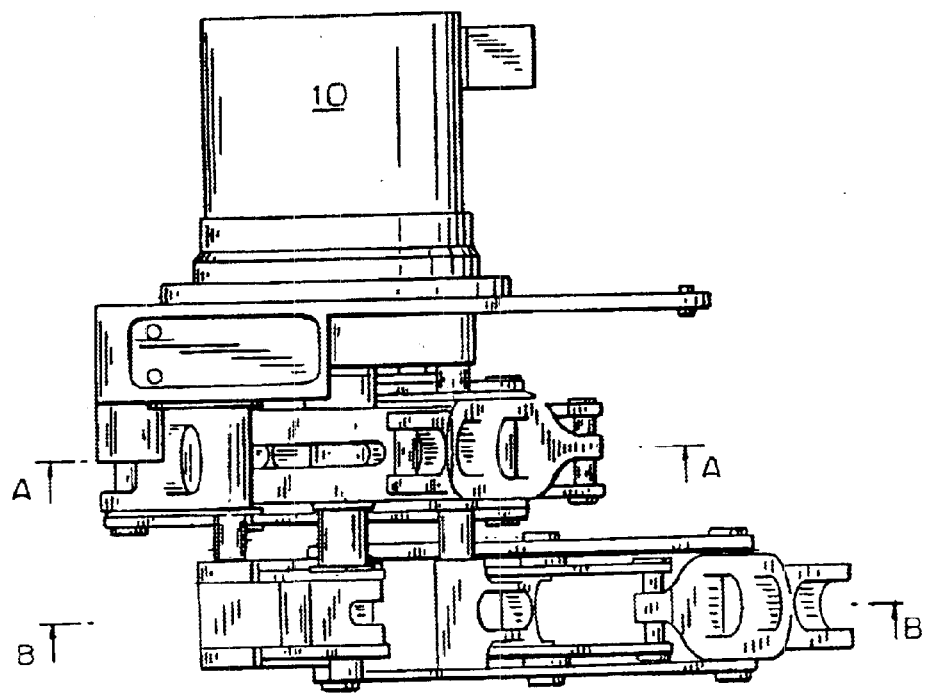
Figure 17:
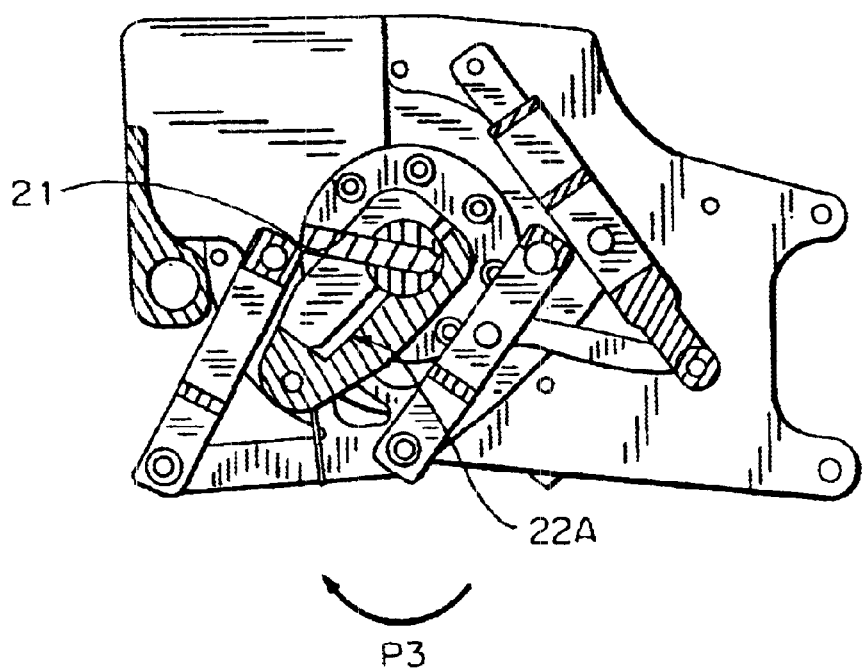
Figure 18:
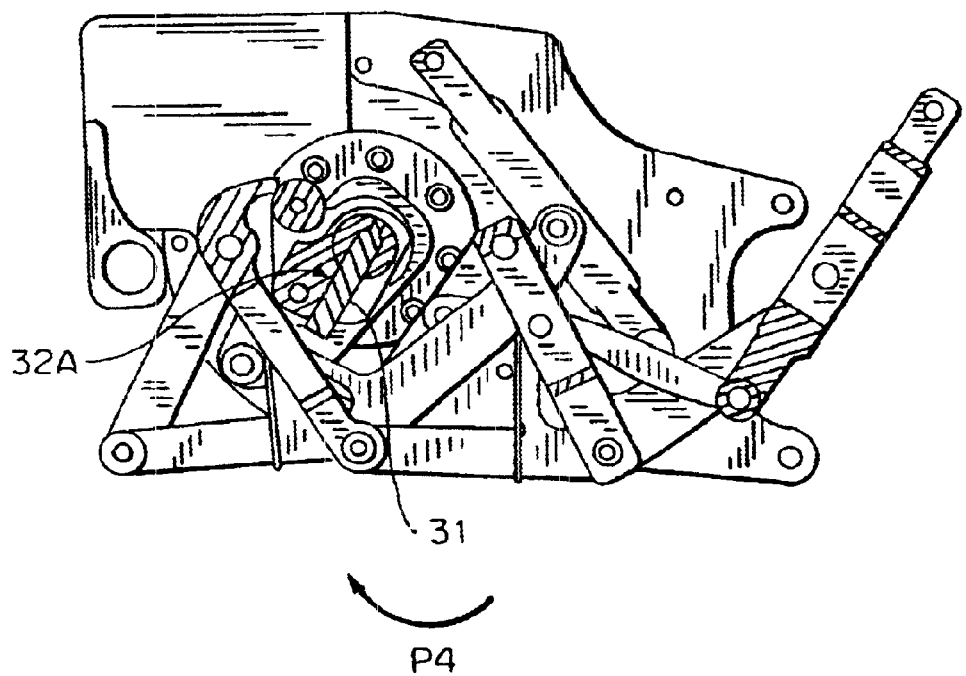

The details of this coupling in the individual operating positions of the actuator are schematically sketched in FIGS. 7, 8, 12, 13 and 17, 18, each of which represents a cross section through the actuating plane of the first actuating arm 20 or of the second actuating arm 30. The respective cross section planes are shown in FIGS. 6, 11 and 16.

It should be noted here that the shape of the two actuating arms 20 and 30 and their hinging on the pivot shafts have been selected to be different from one another because the opposite movements of the two eccentric devices 22 and 32 must lead to a movement in the same direction of the associated actuating element 24 or 34 in order to achieve the movement, correspondingly in the same direction, for actuating the two foot pedals. Not only are toggle levers 25 and 35 used for this, but also the intermediate pieces and hinge arms shown in the drawings, by means of which the toggle levers 25 and 35 and also the actuating elements 24 and 34 are hinged on the pivot shafts 12 and 13.

The mutual action of the individual components will now be explained with reference to a movement sequence with the activation of the two actuation elements 24 and 34 taking place sequentially:

The point of departure is the neutral position, represented in FIGS. 4 to 8, of the actuator, wherein the two pins 21 (FIG. 7) and 31 (FIG. 8) on the motor shaft 11 are on respectively different sides of their associated stops 22A, 32A, and the two actuating elements 24 and 34 take up their neutral position, as is also represented for the actuating element 34 in FIGS. 1 to 3.

If the servomotor 10 is turned in a counterclockwise direction, the first pin 21 acts on its associated stop 22A in the eccentric device 22 (arrow P1 in FIG. 12), whereupon stop 22A is pivoted and extends the first actuating arm 20 out of its neutral position into the full braking position, represented in FIG. 1 and in FIGS. 9 to 13, i.e. performs the actuating process by means of which the brake pedal is moved, depending on the angle of rotation of the servomotor 10, or the motor shaft 11. A restoring spring (not represented) is tensed in the course of this actuating movement. During this movement in a counterclockwise direction (arrow P2 in FIG. 13), the second pin 31 moves away from its associated stop 32A and therefore does not act on its associated eccentric device 32. As a result the second actuating arm 30 remains in its neutral position, also represented in FIGS. 1 to 3.

When the actuating process (braking) is terminated, the servomotor 10, or the motor shaft 11, turns in a clockwise direction back into the neutral position, i.e. the first pin 21 moves away from its associated stop 22A (FIG. 12), whereupon the first actuating element 24 is moved back into its neutral position because of the action of the restoring spring assigned to it, and therefore the neutral position of the actuator represented in FIGS. 4 to 8 is achieved.

If a rotation of the shaft 11 in a clockwise direction takes place (arrows P3 and P4 in FIGS. 17, 18), the second pin 31 acts on its associated stop 32A on the eccentric device 32, and the same process is performed for the second actuating arm 30, i.e. now the second actuating element 34 is extended because of the tension of its associated restoring spring and actuates the gas pedal, while the first pin 21 turns away from it's associated stop 22A and the first actuating arm 20 remains in its neutral position. Here, too, the return of the actuating element 34, or of the second actuating arm 30, by means of the restoring spring 33 into the neutral position of the actuator represented in FIGS. 4 to 8 takes place following the return movement of the motor 10, or the motor shaft 11, into the neutral position.

Only the actuator itself is represented in FIGS. 1 to 18, i.e. a device which generates an actuating movement through its actuating elements 24, 34, the geometry and the kinematic sequence of which approximately correspond to the actuating sequence of a foot pedal (gas or brake pedal) of a motor vehicle.

Figure 19:
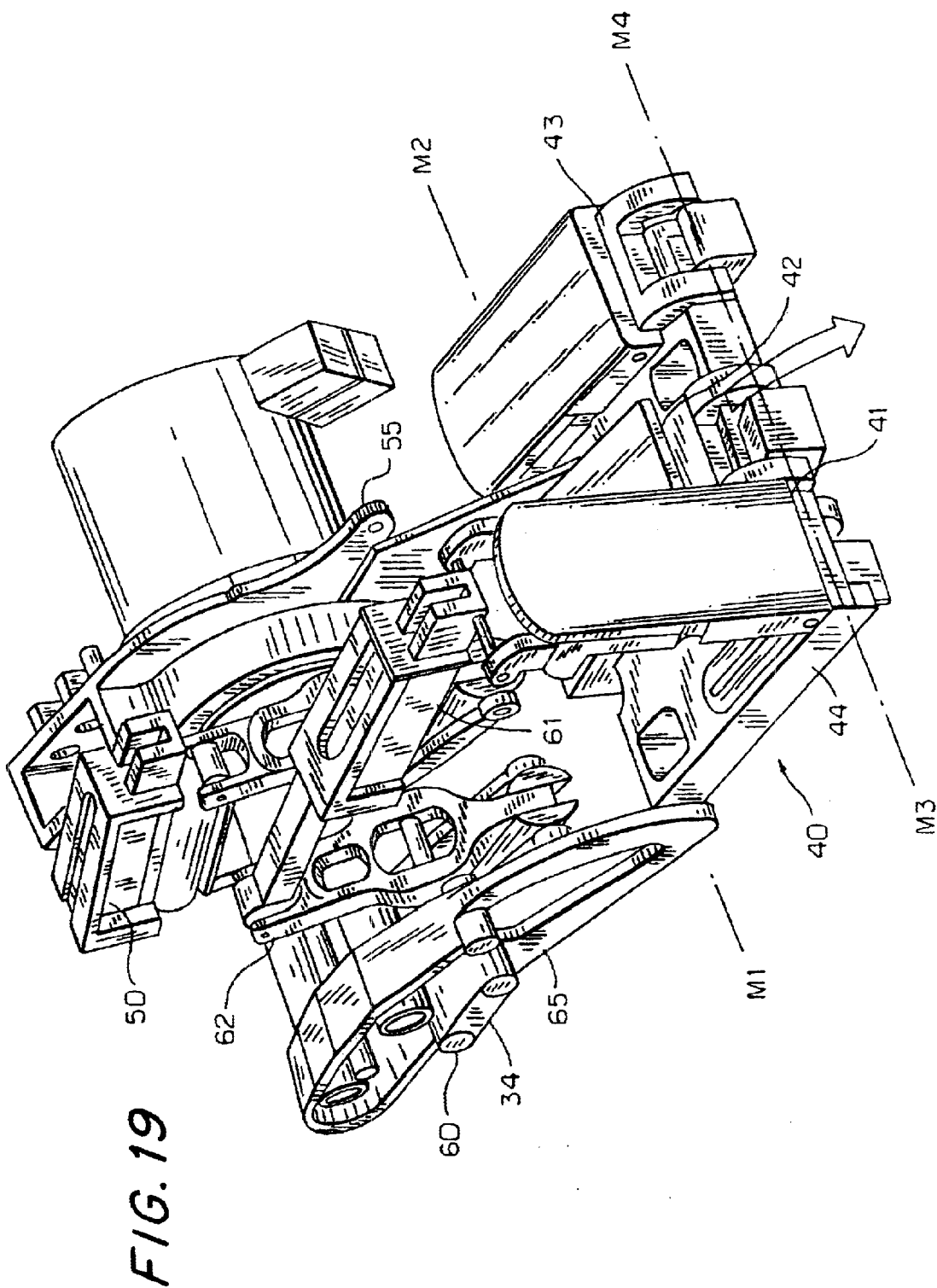
FIGS. 19 and 20 are perspective representations of an embodiment of an actuator with a pedal arrangement.
Figure 20:
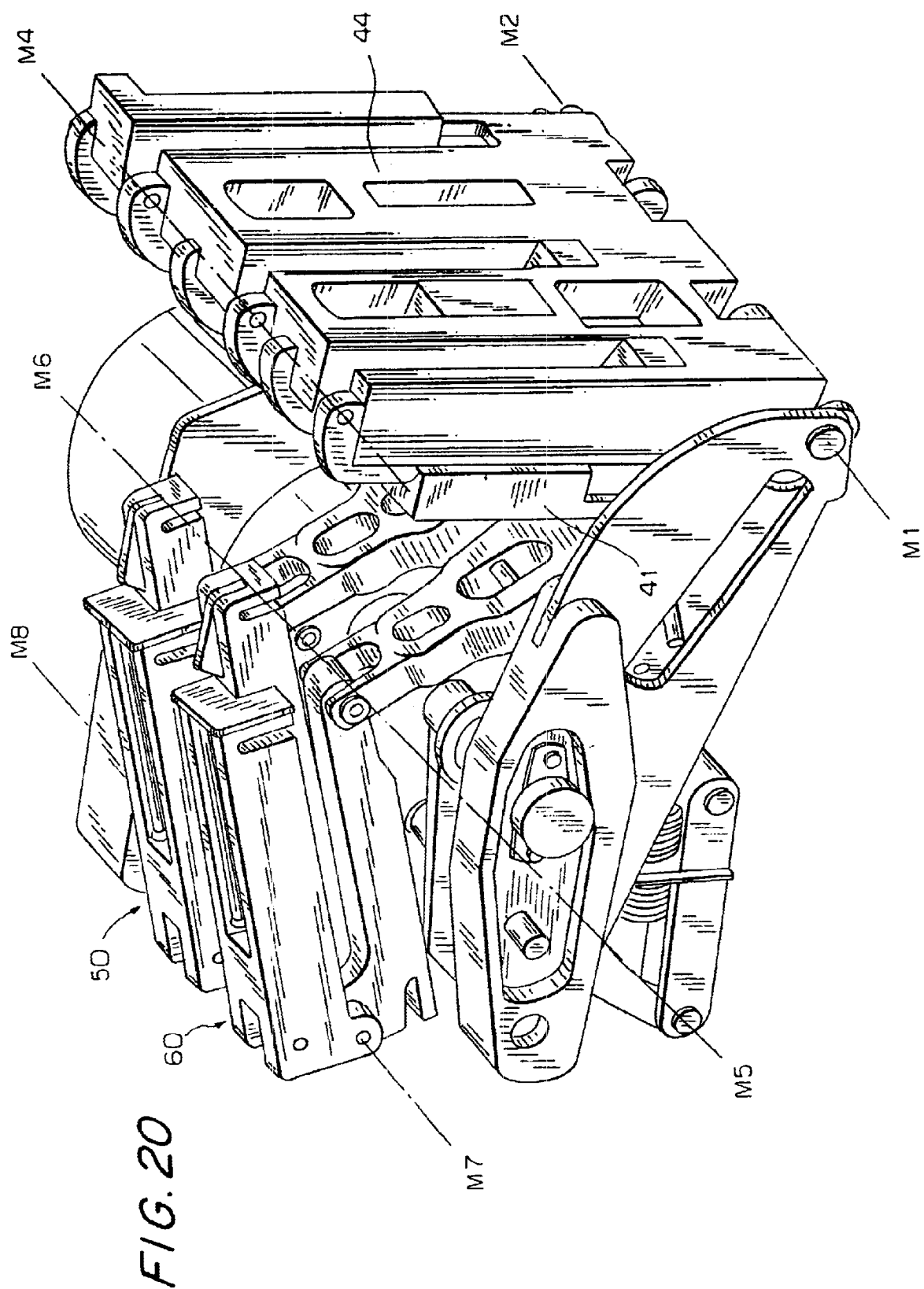
Figure 21:
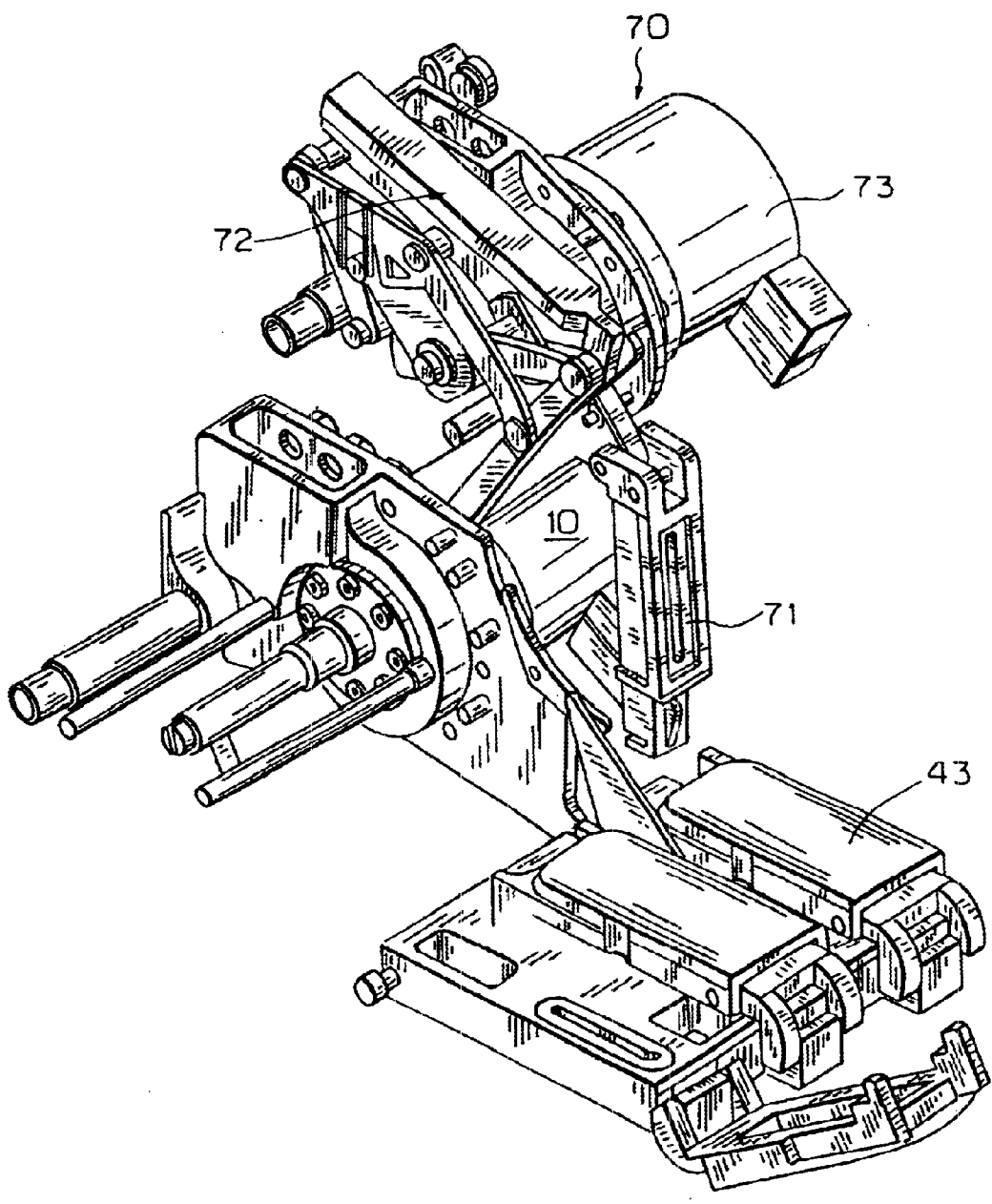
FIGS. 21 and 22 are partial representations of an embodiment of an actuator with an associated clutch actuator.
Figure 22:
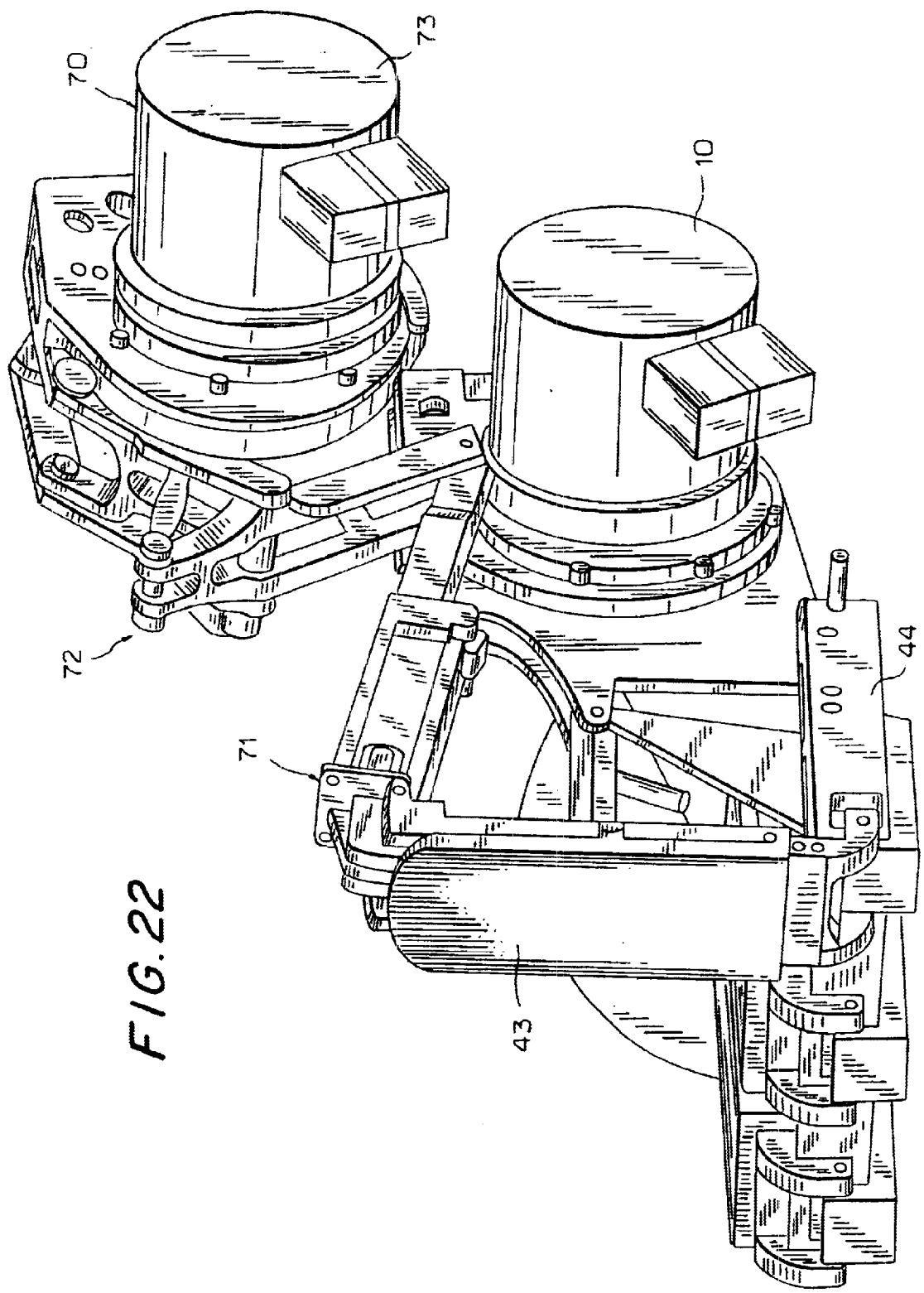

For the purpose of a more flexible adaptation to the individual circumstances in the lower area of the motor vehicle between the pedals and the driver's seat, FIGS. 19 and 20 represent a further development of the solution in accordance with the invention, wherein the actuator is coupled with a pedal arrangement 40, which has pedals 41, 42 and 43, which then directly act on the respectively associated pedals of the motor vehicle. This pedal device 40 consists of a mounting plate 44, which is pivotably connected by means of shafts M1 to M2 with support arms 55, 65, wherein the support arms 55 and 56 are structurally embodied in such a way that they can be fastened on the actuator on both sides of the two actuating arms 20 and 30, or are formed as support plates, for example, by appropriately shaped components of the actuator itself.

In the exemplary embodiment represented in FIGS. 19 and 20, the three pedals 41, 42, 43 are hinged by means of a common shaft M3 to M4 to the mounting plate 44, so that the pedals can be tilted out of a position of rest (pedals 42 and 43 in FIG. 19) into their actuating position (pedal 41 in FIG. 19). In this actuating position the upper end of a pedal is connected by means of a connecting element 50, 60 with the associated actuating element 24, 34 of the actuator. Each connecting element 50 and 60 is embodied in two parts in such a way that a tilt shaft M7, M8 (FIG. 20) is formed in addition to the pivot shaft M5 to M6 and extends through the upper end of the associated actuating elements 24, 34. The two parts 61 and 62, or 51 and 52, of the connecting elements 50, 60 are preferably also designed to be longitudinally displaceable so as to preset the initial positioning of a pedal 41, 42, 43 on the foot pedal of the motor vehicle assigned to it.

Thus, in FIG. 19 the pedal 41, which is used for actuating the gas pedal of the motor vehicle, is connected by means of the connecting element 60 with the upper end of the actuating element 34, which is in a neutral position. If now the servomotor 10 performs the actuating movement described above, the actuating element 34 is pivoted, for example into the position represented in FIG. 14 and, via the connecting element 60, takes the pedal 41 along which, after appropriate calibration, actuates the gas pedal of the motor vehicle in the intended manner and with the intended force (arrow in FIG. 19).

FIG. 20 shows the assembly of the actuator and the pedal device in a compact state, in which it has been optimized, in particular for transport and installation in the lower area of the motor vehicle.

The connecting elements 50, 60, as well as the pedals 41 to 43 and the entire mounting plate 44 have been folded into a compact unit along the axes represented in FIG. 20, wherein the connecting elements 50 and 60 come to rest above the actuator, and the mounting plate 44 with the pedals 41 to 43 folded on it are in an approximately vertical position in front of the actuator. The entire unit of actuator and pedal arrangement is introduced into the lower area of the motor vehicle while in this assembly position, the mounting plate 44 is then flipped down on the floor of the motor vehicle, the pedals 41 to 43 are flipped up, and the connecting elements 50 and 60 are folded out and their front ends are coupled with the upper ends of the associated pedals, so that the frictionally connected coupling between the actuator on the one side and the pedal 41, shown for use with the gas pedal in FIG. 19, on the other side, is formed. Only the coupling of the pedal 41 for the gas pedal is represented in FIG. 19 for reasons of simplifying the drawing. However, it can be clearly seen that such a frictional connection for actuating the brake pedal can also be provided by flipping the pedal 42 up and pivoting the connecting element 50 out, so that then, by means of the rotation of the servomotor 10 in a clockwise or counterclockwise direction, as described earlier herein, either the pedal 41 (for the gas pedal) or the pedal 42 (for the brake pedal) is actuated.

The pedal arrangement 40 represented in FIGS. 19 to 22 has three pedals, in particular also a pedal 43 on the left side, viewed in the driving direction, for actuating the vehivle clutch pedal. To make this possible, the actuator in accordance with the invention for actuating the gas pedal and the brake pedal can be complemented by a clutch actuator 70. The clutch actuator 70 has an additional servomotor 73, which acts via an actuating linkage 72 on a connecting element 71, which is essentially constructed identically to the connecting elements 50 and 60 and which, following the attachment to the pedal 43 (FIG. 22), can act on the clutch pedal via the actuating linkage 72. In order to make the connection of the clutch actuator 70 clear, the actuator which has already been described in detail above is only rudimentarily shown. The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same functions can be used; and it is intended that such expressions be given their broadest interpretation.

What is claimed is:

1. An actuator for operating foot pedals of a motor vehicle in order to generate foot pedal movements that correspond to movements produced by a driver during operation of the motor vehicle, said actuator comprising: a servomotor having a motor shaft that is selectively rotatable in either one of two senses; two actuating arms; and coupling means coupling said actuating arms to said servomotor for causing one of said actuating arms to operate only a first one of the vehicle foot pedals in response to rotation of said motor shaft in a first one of the two senses and for causing the other one of said actuating arms to operate only a second one of the vehicle foot pedals in response to rotation of said motor shaft in a second one of the two senses.

2. The actuator in accordance with claim 1, further comprising at least one pivot shaft which is arranged parallel with said motor shaft, and wherein each of said actuating arms comprises at least two linkage elements and an actuating element, said linkage elements being pivotable around said at least one pivot shaft in such a way that said actuating element performs a pivot movement for actuating an associated vehicle foot pedal.

3. The actuator in accordance with claim 2, wherein said coupling means comprise, for each of said actuating arms, first and second coupling elements movable by said motor shaft.

4. The actuator in accordance with claim 3, wherein each actuating arm is coupled to said shaft via the respective second coupling element, which is maintained fixed in place on said shaft, a connection of a first one of said actuating arms with said shaft is established when rotation of said shaft takes place in a first sense, a connection of the second one of the actuating arms with said shaft is established when rotation of said shaft takes place in the second sense, and no force is applied to an actuating arm when no connection is established for that arm.

5. The actuator in accordance with claim 4, wherein said shaft has a neutral position, starting from which a selected actuating arm operates a respective foot pedal by selecting the sense of rotation of said shaft.

6. The actuator in accordance with claim 3, wherein, for each of said actuating arms, said second coupling element is coupled to said actuating arm via said first coupling element, and said first coupling element is mounted to rotate coaxially with said shaft.

7. The actuator in accordance with claim 3, wherein each first coupling element is an eccentric device having a hollow space or gap that receives said respective second coupling element.

8. The actuator in accordance with claim 3 wherein each second coupling element is a pin that projects radially away from said shaft.

9. The actuator in accordance with claim 3, wherein: each first coupling element is an eccentric device having a hollow space or gap that receives said respective second coupling element; each second coupling element is a pin that projects radially away from said shaft; and the hollow space or gap of each said first coupling element forms a stop located in the sense of rotation of the associated pin for transferring torque of said servomotor to the associated first coupling element.

10. The actuator in accordance with claim 9, wherein: each actuating arm is coupled to said shaft via the respective second coupling element, which is maintained fixed in place on said shaft; a connection of a first one of said actuating arms with said shaft is established when rotation of said shaft takes place in a first sense; a connection of the second one of the actuating arms with said shaft is established when rotation of said shaft takes place in the second sense; no force is applied to an actuating arm when no connection is established for that arm; and said stops are located on respectively opposite sides of said pins in relation to the senses of rotation of said shaft.

11. The actuator in accordance with claim 10, wherein: said shaft has a neutral position, starting from which a selected actuating arm operates a respective foot pedal by selecting the sense of rotation of said shaft; and in the neutral position of said shaft, said pins are positioned directly in front of their associated stops.

12. The actuator in accordance with claim 11, further comprising two restoring spring each coupled to a respective actuating arm to return the respective actuating arm from an actuating position into a neutral position when said shaft returns into its neutral position.

13. The actuator in accordance with claim 1, wherein said actuating arms are operated to move essentially in the same direction for operating the respective foot pedals.

14. The actuator in accordance with claim 13, wherein each of said actuating arms comprises an actuating element for acting on a respective foot pedal.

15. The actuator in accordance with claim 13, wherein each of said actuating arms comprises a respective toggle lever.

16. The actuator in accordance with claim 1, further comprising two pivot shafts which are arranged parallel with said motor shaft, and wherein each of said actuating arms comprises at least two linkage elements and an actuating element, said linkage elements being pivotable around said pivot shafts in such a way that said actuating element performs a pivot movement for actuating an associated vehicle foot pedal.

17. The actuator in accordance with claim 1, further comprising: a pedal arrangement having at least two pedals; and two connecting elements each connecting a respective actuating arm to a respective pedal.

18. The actuator in accordance with claim 17, wherein each said connecting element is a two-part profiled rod that is foldable into a mounting position over the associated actuating arm.

19. The actuator in accordance with claim 17, further comprising a common mounting plate, and wherein each of said pedals has a lower end that is hinged to said common mounting plate and an upper end that is connected to the associated connecting element.

20. The actuator in accordance with claim 17, in combination with a clutch actuator, wherein said pedal arrangement has three pedals, one of which is a clutch pedal coupled to said clutch actuator.

21. The actuator in accordance with claim 20, wherein said clutch actuator comprises a servomotor, an actuating arm and an actuating element coupling said actuating arm to said clutch pedal.

22. The actuator in accordance with claim 1, wherein said servomotor is a stepping motor.

* * * * *